Figure 1:
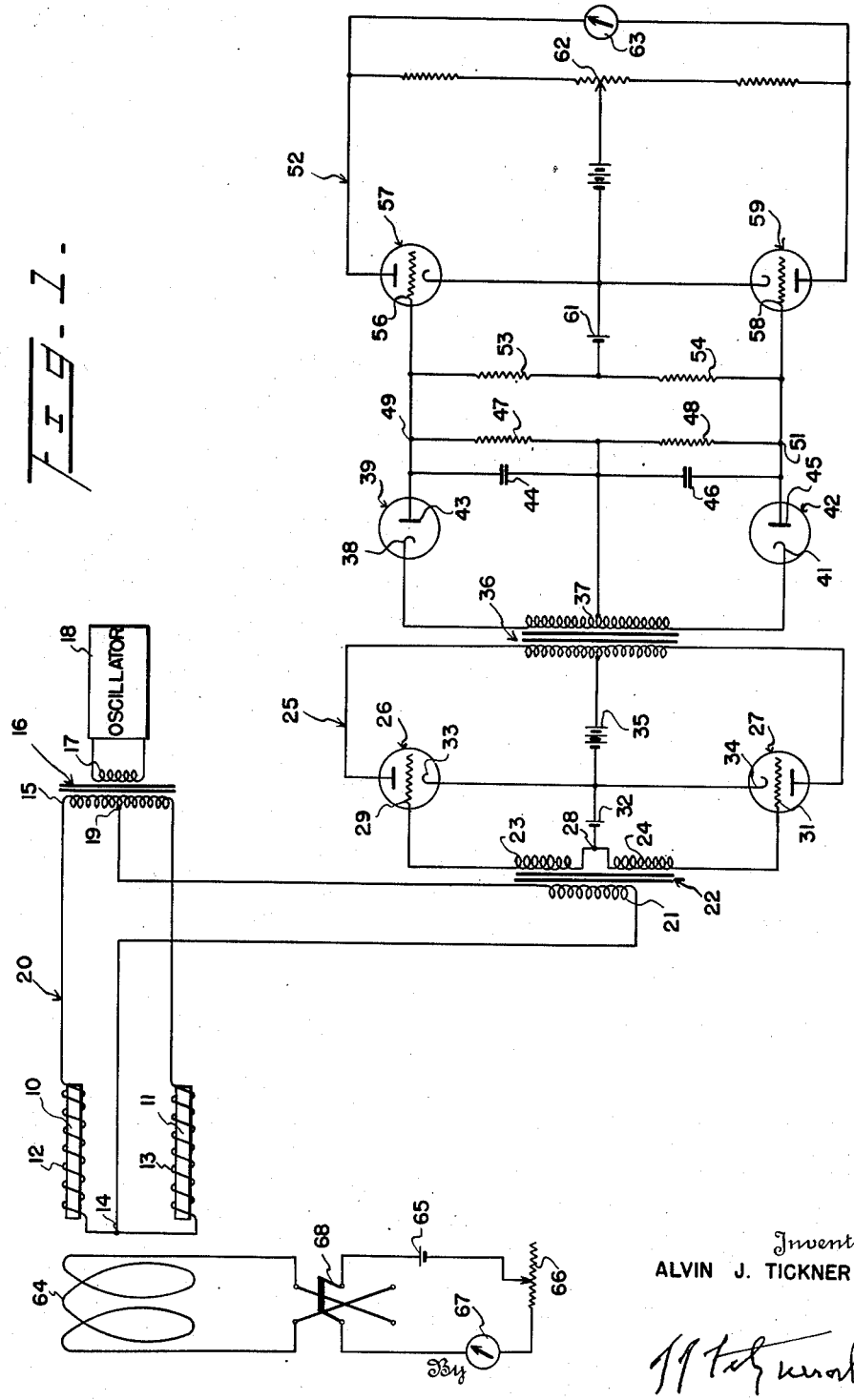

Dec. 1, 1953

A. J. TICKNER 2,661,455

FLUX MEASURING SYSTEM

Filed Feb. 13, 1943

2 Sheets-Sheet 1

Inventor
ALVIN J. TICKNER

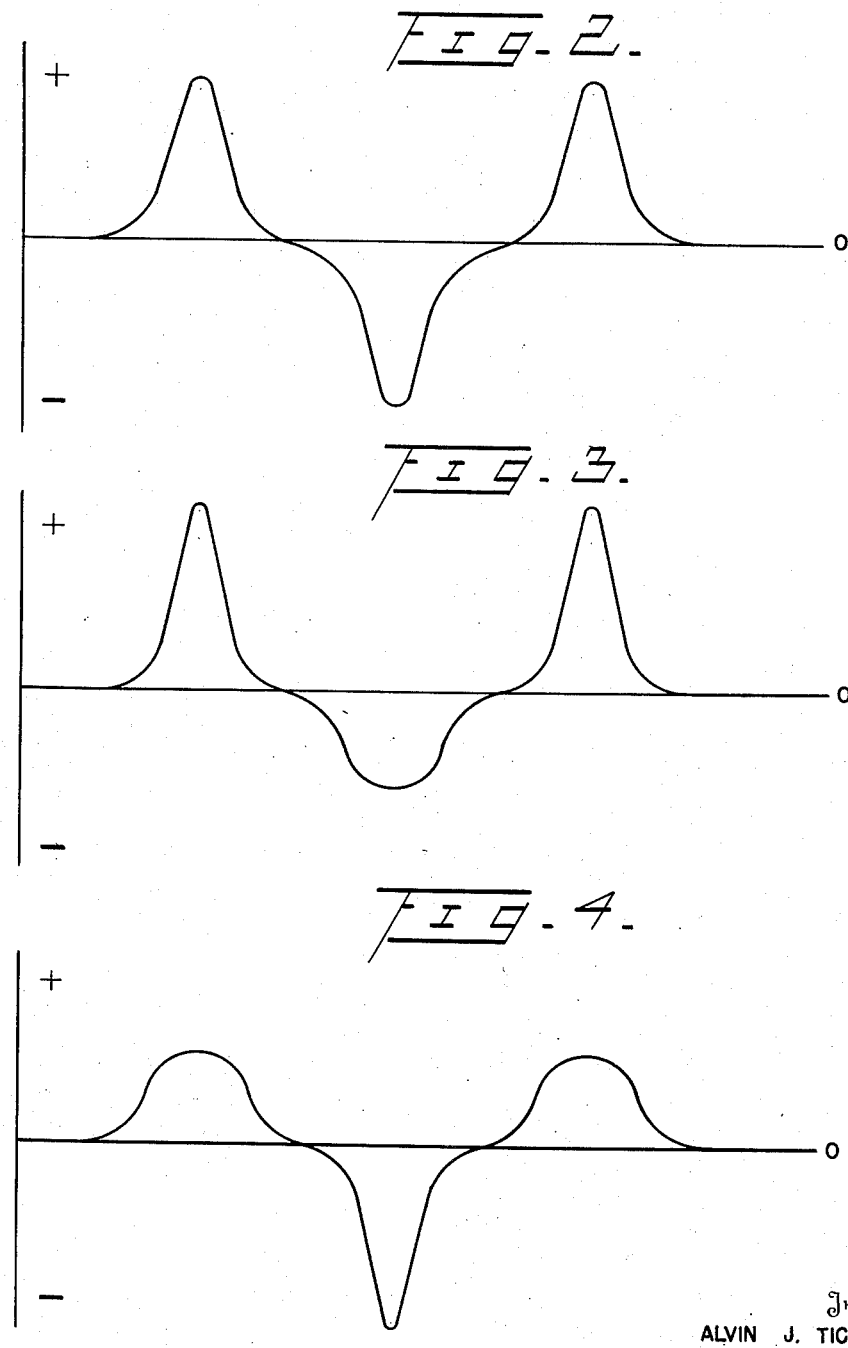

Patented Dec. 1, 1953

2,661,455

UNITED STATES PATENT OFFICE 2,661,455

FLUX MEASURING SYSTEM

Alvin J. Tickner, Washington, D. C.

Application February 13, 1943, Serial No. 475,760

17 Claims. (Cl. 324—43)

(Granted under Title 35, U. S. Code (1952), sec. 266)

This invention relates to flux measuring systems and more particularly to systems for indicating both the direction and magnitude of a magnetic field.

One object of the invention is to provide a system which is capable of indicating very small field fluxes with great accuracy.

Another object is to provide a magnetic field measuring system having provision for measuring and indicating the difference in peak values of alternate half cycles of an asymmetrical A. C. voltage indicative of the strength of a field to be measured without introducing direct current components which by Lenz's law must oppose the field and thereby decrease the sensitivity of the system.

Another object resides in the provision of a system which is constructed and arranged to measure and indicate the difference in peak values of alternate half cycles of an asymmetrical A. C. voltage indicative of the strength of a magnetic field to be measured without making the areas of the alternate half cycles unequal.

Another object is to provide a system for measuring and indicating magnetic flux having provision for generating an asymmetrical A. C. voltage in a field sensitive electric circuit in which the need for rectification of the voltage in the circuit to provide a measure of the flux proportional to the asymmetry of the voltage is obviated.

Another object is to provide a system for measuring a magnetic field having provision for generating an asymmetrical A. C. voltage proportional to the strength of the field in a magnetic field sensitive electric circuit in which the resistance of the circuit is constant during any given cycle of the voltage and having provision for measuring and indicating the difference in the peak values of alternate half cycles of the voltage as a measure of the field.

Another object resides in the provision of a magnetic field sensitive electric circuit having constant resistance during any given cycle of the asymmetrical voltage generated in the circuit whereby rectification and resultant introduction of direct current components in the circuit are avoided and the difference in the peak values of alternate half cycles of the voltage provides a true measure of the strength of a magnetic field detected by the circuit.

Another object is to eliminate from prior known systems those elements which are a source of inaccuracy because of variations in their characteristics during use.

Another object of this invention is to provide a system wherein the simpler types of electronic amplifiers may be employed when it is desired to measure very small values of field flux.

Still another object of the invention is the provision of a new and improved differential peak voltage network which will respond to the difference in magnitude between peaks of the positive and negative half cycles of an alternating voltage.

In carrying this invention into effect, a periodically varying voltage is supplied from a suitable source, and magnetic field responsive means are provided for effecting a variation in the wave form of the voltage together with indicating means responsive to this voltage form variation.

More specifically, an electric circuit is supplied with a symmetrical alternating voltage. The magnetizing winding of a reactor having a permeable core is connected to this circuit. If a steady direct flux, such for example, as the flux due to the earth's magnetic field is superimposed upon the alternating flux of the core due to the magnetizing winding, this superimposed steady flux will produce a dissymmetry in the shape of the alternating voltage wave. In general, the voltage wave is altered thereby so that it is steeply peaked on one side of the zero axis and noticeably flattened on the other side, both half waves, however, being of equal area.

In prior art systems, for instance, such as the system shown in Thomas Patent No. 2,016,977, issued October 8, 1941, this unsymmetrical alternating voltage wave is impressed upon a resistance having a non-linear characteristic and this produces an alternating current therethrough having a wave form in which the areas of the alternate half cycles are unequal with the result that a component of direct current is produced in the circuit, the magnitude and direction of which is indicated by an indicating instrument. It has been found, however, that it is difficult to procure non-linear resistances which maintain their characteristics under conditions of varying temperature and humidity and which are substantially unaffected by aging. When duplicate non-linear resistances are required for balanced circuit use, the problem is further complicated by the fact that two such balanced resistances which maintain similar characteristics during all stages of their use are almost impossible to obtain. This leads to inaccuracies in the results produced. Another disadvantage found in systems such as that disclosed in the foregoing Thomas patent, is the difficulty in amplifying the direct current output of the circuit when very small fluxes are being measured before applying the direct current output to the indicating instrument. This is due to the inherent complexity of direct current amplifiers as distinguished from alternating current amplifiers.

A further disadvantage of the prior art systems such as that disclosed in the foregoing Thomas patent, is the reduction in sensitivity of the system due to the fact that the components of direct current in the circuit must by Lenz's law oppose the field being measured whereby the asymmetry of the alternating current wave is not a true measure of the strength of the field.

In the present system, these disadvantages are avoided by omitting the non-linear resistances and employing an alternating current amplifier to amplify the unsymmetrical alternating voltage when this is found necessary. The unsymmetrical alternating voltage, before or after amplification, as the case may be, is passed into a network wherein the positive half cycles of the voltage are rectified and the peak voltages stored in a condenser provided with a high resistance discharge resistor so that the voltage across the condenser is at all times representative of the peak voltage of the positive half cycles. Similar rectification and storing of the peak voltages of the negative half cycles takes place in the network. The condensers are connected such that the voltages thereof are in opposition and the differential voltage is supplied, with or without amplification as desired, to an indicating instrument.

By reason of the omission of the non-linear resistances from the magnetic field sensitive circuit of the present invention, the resistance in the circuit is constant for any given cycle of the asymmetrical voltage, there is no rectification of the asymmetrical voltage in the circuit, the areas of the positive and negative cycles of the asymmetrical current in the circuit are equal and consequently the integration of current in the circuit is zero, i. e., there is no direct current component in the circuit to set up an opposing steady field in the core with the result that there is no distortion of the asymmetry of the voltage in the circuit due to the opposing field in the core. In the present system, therefore, the asymmetry of the voltage in the circuit, i. e., the difference in the peak values of alternate half cycles of the voltage, is truly representative of the strength of the field which causes the dissymmetry in the shape of the alternating voltage wave.

For a better and more complete understanding of the invention reference should be had to the following specification and to the accompanying drawings in which:

Fig. 1 is a simple diagrammatical illustration of the invention showing the magnetic field responsive element and the external circuit to which it is connected; and, Figs. 2, 3 and 4 are explanatory characteristic curves which serve to illustrate the operation of the system.

Referring now to the drawings, the magnetic field responsive means comprises two substantially parallel cores 10 and 11 upon which two similar coils 12 and 13 respectively are arranged to constitute a reactance device. Although the cores may be made of any suitable magnetic material, they are preferably made of material having an extremely high permeability such, for example, as the magnetic alloy sold on the market under the trade name of Permalloy. The coils 12 and 13 are connected so as to have one end of each of the coils joined together at 14, the other ends of the coils being connected to the respective ends of the secondary winding 15 of a transformer 16. The primary winding 17 is connected to an oscillator 18, the oscillator supplying a frequency of the order of eight hundred cycles per second to the primary winding 17. The secondary winding 15 of the transformer has a center tap 19 which is connected to the point 14 through primary winding 21 of the transformer 22.

It will be noted that the elements so far described constitute a bridge circuit 20 with the coil 12 as one arm, the coil 13 as a second arm and the upper and lower halves of the transformer secondary 15 as the third and fourth arms respectively. The transformer 22 supplies a voltage representative of the state of balance of the bridge 20 to an alternating current amplifier 25 comprising two electronic tubes 26 and 27. The transformer 22 has secondary windings 23 and 24 which are joined together at 28, the other end of the secondary winding 23 being connected to the grid 29 of the tube 26, while the other end of the secondary winding 24 is connected to the grid 31 of the tube 27. A battery 32 biases the two grids 29 and 31 with respect to their cathodes 33 and 34 respectively. The anodes of the tubes 26 and 27 are supplied with voltage from a source 35, the output from the anodes of the tubes 26 and 27 being fed to the primary winding of a transformer 36. The secondary winding of the transformer 36 is provided with a mid-tap 37, one end of the transformer secondary winding being connected to a rectifying device such, for example, as the cathode 38 of a rectifier tube 39 and the other end of the transformer secondary winding being connected to a similar rectifying device such as the cathode 41 of a rectifier tube 42. The anode 43 of the tube 39 is connected to one plate of a condenser 44 whereas the other plate of the condenser is connected to the midtap 37. The anode 45 of the tube 42 is connected to one plate of the condenser 46, the other plate of this condenser being also connected to the mid-tap 37. In parallel with the condensers 44 and 46 are respectively connected a pair of resistors 47 and 48. The rectifier tube 39, the condenser 44 and resistor 47 comprise a peak voltmeter circuit for the positive half cycles of the voltage supplied to the transformer 36, the rectifier tube 42, the condenser 46 and resistor 48 performing a similar function with respect to the negative half cycles of the voltage.

The values of the circuit components in each of these voltmeter circuits are so adjusted that the charging rate of each of the condensers respectively through the associated rectifier is sufficiently rapid so that it will substantially follow the instantaneous value of the alternating voltage impressed across the rectifier and condenser when the voltage has the proper sign. Each condenser discharges through the associated resistor which is of relatively large value and is so proportioned that the discharge rate will be low compared to a cycle of the impressed voltage and thus the voltage across each condenser will be substantially the peak voltage for whichever half of the cycle is passed by the associated rectifier. Since the condensers 44 and 46 are connected with the voltages in opposition, a differential voltage will appear across the points 49 and 51 which will be substantially proportional to the difference in the peak voltages of the positive and negative half cycles. This differential voltage is supplied to an amplifier 52 through a resistance coupling comprising resistances 53 and 54. One end of the resistance 53 is connected to the grid 56 of an amplifying tube 57 and one end of the resistance 54 is similarly connected to the grid 58 of an amplifying tube 59. The opposite ends of both of the resistors are connected together and to a bias source 61. The cathodes of the tubes 57 and 59 are connected to each other and to the bias source 61 in any conventional manner. The anodes of the tubes 57 and 59 are connected to an output circuit including a resistance 62. Across this output circuit is connected an indicating instrument 63, the resistor 62 being employed as a zero adjuster for the indicating instrument.

The operation of the system so far described is as follows:

The coils 12 and 13, as heretofore stated, are elements of a bridge circuit 20 which comprises these coils and the secondary winding 15 of the transformer 16, the oscillator 18 serving to energize the bridge circuit including the coils 12 and 13. The output terminals of the bridge circuit comprise the points 14 and 19. The coils are so connected in the bridge circuit that at any instant the flux set up in each of the cores by the currents flowing through the coils is in opposite directions in each of the cores respectively and thus when a substantially steady direct flux passes through the cores 10 and 11 due to the earth's magnetic field or any other field which it is desired to measure, this direct flux is superimposed upon the alternating fluxes in the cores so that during one half cycle it adds to the flux in one of the cores and concurrently therewith opposes the flux in the other core, while during the next succeeding half cycle the flux to be measured opposes the flux in the said one of the cores and adds to the flux in the said other of the cores.

The coils are so wound that the cores are operated through saturation during each half cycle of the voltage wave. Therefore, in the presence of a field to be measured, saturation is reached sooner during one half cycle in each of the cores than during the next succeeding half cycle in the same core. As a result of this the wave form of the circuit voltage of the bridge 20 is rendered unsymmetrical about its zero axis; that is one half cycle of the wave, for example, the positive half cycle is steeply peaked whilst the succeeding half cycle is noticeably flattened as shown in Fig. 3. This figure may be compared with the curve in Fig. 2 which shows the voltage wave when substantially no external flux passes through the cores 10 and 11 and the bridge 20 is substantially balanced. It may here be pointed out that, whether the voltage wave is symmetrical as in Fig. 2 or unsymmetrical as in Fig. 3, the area under the positive half cycle is substantially equal to the area under the negative half cycle of the wave. If the steady direct flux which is to be measured is in the opposite direction to that which produced the curve of Fig. 3, the core which was saturated by the positive half cycle is now saturated later than the other core so that the voltage wave is rendered unsymmetrical about its zero axis in the manner indicated in Fig. 4 and the negative half cycle is sharply peaked, the positive half cycle being flattened. It will be noted by comparing Figs. 3 and 4, that the peaks in these voltage waves are on opposite sides of the zero axis in the respective figures and the areas under the positive and negative half cycles are substantially equal.

Returning to Fig. 1, it will be seen that a voltage having either the characteristics of Fig. 3 or Fig. 4 appears across the points 14 and 19 of the bridge 20 when a field in one direction or the other respectively is measured. The amplifier 25 is connected so as to amplify this voltage wave although the amplifier may be omitted or it may have as many stages as required. The amplified voltage wave is applied to the network including the rectifier tubes 39 and 42 and the rectifier tube 39 will rectify the positive half cycles of the voltage wave whereas the rectifier tube 42 will rectify the negative half cycles of the voltage wave. As pointed out above, the tube 39 charges the condenser 44 and the constants of this circuit are so adjusted that the charging rate of the condenser will substantially follow the instantaneous peak values of the positive half cycle voltage impressed across the rectifier. This is likewise true of the condenser 46 except that this condenser is charged to the peak values of the negative half cycles of the voltage.

The condenser 44 discharges through its discharge resistor 47 at a rate which tends to maintain the voltage on the condenser 44 substantially at the peak voltages of the respective positive half cycles. The resistor 48 performs the same function with respect to the condenser 46. The condensers 44 and 46 are connected so that the voltage across the points 49 and 51 is equal to the difference in the peak voltages of the positive and negative half cycles of the voltage. This differential voltage is amplified by the amplifier 52 having as many stages as desired and is indicated on the instrument 63. The reading of the instrument 63 is, therefore, a measure of the magnitude and direction of the external field to which the cores 10 and 11 are subjected. In cases where a large electrical unbalance exists across the points 14 and 19 of the bridge 20, the potential of the bias source 61 may be increased so that only the peaks of the voltages are amplified to prevent overloading of the amplifier.

If it is desired to produce a null reading in the instrument 63 when the cores 10 and 11 are subjected to a field to be measured, a coil 64 is placed adjacent to the cores. This coil is connected in circuit with a battery 65, a variable resistance 66, an indicating instrument 67 and a reversing switch 68. By means of these elements, it is possible to oppose the flux to be measured by another flux set up by the coil 64 of proper magnitude and direction so as to neutralize the flux to be measured. This will be indicated by a zero or null reading on the indicating instrument 63 and the flux to be measured will then appear as a reading on the indicating instrument 67.

From the foregoing, it will be apparent that it is unnecessary to provide the bridge circuit 20 with non-linear resistance devices such, for example, as the devices disclosed in the Thomas patent referred to above, which render dissimilar the areas under the positive and negative half cycles of the current wave. The elimination of these devices, which have undesirable characteristics affecting the accuracy of the system as pointed out above, is made possible by providing a novel network which responds to the difference in the peak voltages of the positive and negative half cycles of the voltage wave to give an indication of the direction and magnitude of the magnetic field to be measured while maintaining the areas under succeeding half cycles of the current wave equal. Furthermore, by omitting said non-linear resistance devices, the unbalance voltage of the bridge circuit is capable of amplification by simple alternating current amplifiers where very small magnetic fields are to be measured.

Although in accordance with the provisions of the patent statutes, this invention has been described in concrete form with reference to a preferred embodiment thereof which gives satisfactory results, it will be understood that this form is merely illustrative and that the invention is not limited thereto since alterations and modifications will readily suggest themselves to persons skilled in the art without departing from the true spirit of this invention or the scope of the annexed claims.

The invention herein described and claimed may be manufactured and used by or for the Government of the United States of America for governmental purposes without the payment of any royalties thereon or therefor.

What is claimed as new and desired to be secured by Letters Patent of the United States is:

1. In combination, a bridge circuit, means for supplying said circuit with a periodically varying current, means in said circuit responsive to a magnetic field for effecting a voltage variation in said circuit, said bridge circuit having constant resistance during any given cycle of said voltage whereby the integration of current in the output circuit of the bridge is zero, means operatively coupled to said output circuit of the bridge and responsive to the peak voltages in said circuit, and an electroresponsive device connected to said last named means for indicating the difference in the peak values of said voltages.

2. An indicating system comprising an alternating current bridge circuit, a coil in said circuit, a magnetic core having an alternating magnetic flux produced therein by the current in said coil and arranged to be threaded by a direct magnetic flux for increasing said alternating flux during one half cycle and decreasing said alternating flux during the succeeding half cycle thereby rendering the wave form of the voltage of said circuit unsymmetrical, said bridge circuit having constant resistance during any given cycle of said voltage whereby the integration of current in the output circuit of the bridge is zero, an electroresponsive indicating device, and means operatively coupled to said output circuit of the bridge and responsive to the peak voltages of said unsymmetrical voltage for energizing said device thereby to indicate the difference in the peak values of said voltages.

3. In direct magnetic field direction responsive systems, the combination with an electric bridge circuit, of means for supplying an alternating current to said circuit having a substantially symmetrical wave form, means connected to said circuit and responsive to said direct magnetic field for increasing the magnetic flux produced by said current during one half cycle and diminishing said flux during the succeeding half cycle thereby rendering the wave form of the voltage of said circuit unsymmetrical, said bridge circuit having constant resistance during any given cycle of said voltage whereby the integration of current in the output circuit of the bridge is zero, an electroresponsive indicating device, and means operatively coupled to said output circuit of the bridge and responsive to the peak voltages of said unsymmetrical voltage for energizing said device thereby to indicate the difference in the peak values of said voltages.

4. In combination, a source of periodically varying voltage, a bridge circuit supplied from said source, means responsive to a magnetic field for rendering the wave form of said voltage unsymmetrical comprising a reactance device having a permeable core member adapted to be threaded by the flux of said field and provided with a winding connected to said circuit, an electroresponsive indicating device, said bridge circuit having constant resistance during any given cycle of said voltage whereby the integration of current in the output circuit of the bridge is zero, and means operatively coupled to said output circuit of the bridge and responsive to the peak voltages of said unsymmetrical voltage for energizing said device thereby to indicate the difference in the peak values of said voltages.

5. A magnetic field direction responsive system comprising an electric bridge circuit, means for supplying a periodically varying voltage having a substantially symmetrical wave form to said circuit, means responsive to a magnetic field and connected in said circuit for changing the symmetry of the wave form of said voltage to produce peak voltages on one side of the zero axis thereof which are of greater magnitude than the peak voltages on the other side of the zero axis, said bridge circuit having constant resistance during any given cycle of said voltage whereby the integration of current in the output circuit of the bridge is zero, means operatively coupled to said output circuit of the bridge and responsive to the difference in magnitude of said peak voltages, and an electroresponsive device actuated by said last named means.

6. A magnetic field direction responsive system comprising an electric bridge circuit, means for supplying a periodically varying voltage having a substantially symmetrical wave form to said circuit, means responsive to a magnetic field and connected in said circuit for changing the symmetry of the wave form of said voltage to produce peak voltages on one side of the zero axis thereof which are of greater magnitude than the peak voltages on the other side of the zero axis, said bridge circuit having constant resistance during any given cycle of said voltage whereby the integration of current in the output circuit of the bridge is zero, means operatively coupled to said output circuit of the bridge and responsive to the difference in magnitude of said peak voltages comprising a rectifying device responsive to the peak voltages on one side of the zero axis and a second rectifying device responsive to the peak voltages on the other side of the zero axis, said last named means being included within the output circuit of said bridge circuit, and an electroresponsive device actuated by said last named means.

7. A magnetic field direction responsive system comprising an electric bridge circuit, means for supplying a periodically varying voltage having a substantially symmetrical wave form to said circuit, means responsive to a magnetic field and connected in said circuit for changing the symmetry of the wave form of said voltage to produce peak voltages on one side of the zero axis thereof which are of greater magnitude than the peak voltages on the other side of the zero axis, said bridge circuit having constant resistance during any given cycle of said voltage whereby the integration of current in the output circuit of the bridge is zero, means operatively coupled to said output circuit of the bridge and responsive to the difference in magnitude of said peak voltages comprising a rectifying device responsive to the peak voltages on one side of the zero axis, said rectifying device having a condenser and a discharge resistor connected in parallel therewith and a second rectifying device responsive to the peak voltages on the other side of the zero axis, said second rectifying device having a condenser and a discharge resistor connected in parallel therewith, and an electroresponsive device actuated by said last named means.

8. A magnetic field direction responsive system comprising an electric bridge circuit, means for supplying a periodically varying voltage having a substantially symmetrical wave form to said circuit, means responsive to a magnetic field and connected in said circuit for changing the symmetry of the wave form of said voltage to produce peak voltages on one side of the zero axis thereof which are of greater magnitude than the peak voltages on the other side of the zero axis, said bridge circuit having constant resistance during any given cycle of said voltage whereby the integration of current in the output circuit of the bridge is zero, a differential peak voltmeter network operatively coupled to said output circuit of the bridge and responsive to the peak voltages on both sides of the zero axis for producing a voltage proportional to the difference in magnitude of said peak voltages, and an electroresponsive device actuated by said peak voltmeter network.

9. A magnetic field direction responsive system comprising an electric bridge circuit, means for supplying a periodically varying voltage having a substantially symmetrical wave form to said circuit, means responsive to a magnetic field and connected in said circuit for changing the symmetry of the wave form of said voltage to produce peak voltages on one side of the zero axis thereof which are of greater magnitude than the peak voltages on the other side of the zero axis, said bridge circuit having constant resistance during any given cycle of said voltage whereby the integration of current in the output circuit of the bridge is zero, a peak voltmeter network responsive to the peak voltages on one side of the zero axis, a second peak voltmeter network responsive to the peak voltages on the other side of the zero axis, means for inductively coupling said peak voltmeter networks to said output circuit of the bridge, means for connecting the outputs of said networks in opposition, and an electroresponsive device actuated by said last named means.

10. A magnetic field direction responsive system comprising an electric circuit, means for supplying a periodically varying voltage having a substantially symmetrical wave form to said circuit, means responsive to a magnetic field and connected in said circuit for changing the symmetry of the wave form of said voltage to produce peak voltages on one side of the zero axis thereof which are of greater magnitude than the peak voltages on the other side of the zero axis, said circuit having constant resistance during any cycle of said voltage whereby the integration of the current in the circuit is zero, a network operatively coupled to said circuit and comprising two rectifying paths, each path having a quick charging condenser and a high resistance shunted thereacross, one rectifying path being responsive to the peak voltages on one side of the zero axis, the other rectifying path being responsive to the peak voltages on the other side of the zero axis, and an indicating means actuated by the difference between the charges on said condensers.

11. A magnetic field direction responsive system comprising an electric circuit, means for supplying a periodically varying voltage having a substantially symmetrical wave form to said circuit, means responsive to a magnetic field and connected in said circuit for changing the symmetry of the wave form of said voltage to produce peak voltages on one side of the zero axis thereof which are of greater magnitude than the peak voltages on the other side of the zero axis, said circuit having constant resistance during any cycle of said voltage whereby the integration of the current in the circuit is zero, a rectifying device responsive to the peak voltages on one side of the zero axis, a quick charging condenser and a discharge resistor connected in parallel with the rectifying device, a second rectifying device responsive to the peak voltages on the other side of the zero axis, a quick charging condenser and a discharge resistor connected in parallel with the second rectifying device, means for inductively coupling said rectifying devices to said circuit, and an indicating means responsive to the difference between the charges on said condensers.

12. A magnetic field responsive system comprising a bridge circuit, means for supplying said circuit with a periodically varying voltage, a saturable reactor comprising core means having at least two portions responsive to a magnetic field and a winding on each of said portions connected in respective arms of the bridge so that said portions are magnetized to predetermined values in opposite directions respectively during one half cycle of the voltage and to different values in the reverse directions respectively during the inverse half cycle and corresponding variations are effected in the wave form of the voltage of said arms, means operatively coupled to said output circuit of the bridge and responsive to the peak voltages in said circuit, and an electroresponsive device connected to said last named means thereby to indicate the difference in the peak values of said voltages.

13. A magnetic field responsive system comprising a bridge circuit, means for supplying said circuit with a periodically varying voltage, a saturable reactor comprising core means having at least two portions responsive to a magnetic field and a winding on each of said portions connected in respective arms of the bridge so that said portions are magnetized to predetermined values in opposite directions respectively during one half cycle of the voltage and to different values in the reverse directions respectively during the inverse half cycle and corresponding variations are effected in the wave form of the voltage of said arms, means operatively coupled to said output circuit of the bridge and responsive to the peak voltages in said circuit, a first indicating device connected to said last named means for indicating the difference in the peak values of said voltages, and means including a second indicating device for opposing said magnetic field and reducing the reading of said first indicating device to zero.

14. A magnetic field responsive system comprising a transformer having a primary winding and a secondary winding, means for supplying said primary winding with a periodically varying voltage, a saturable reactor comprising core means having two portions responsive to a magnetic field and a winding on each of said portions, constant resistance means connecting one end of each of said reactor windings to opposite ends of the transformer secondary winding, a connection between the remaining ends of said reactor windings and a mid-tap on the transformer secondary winding, said reactor windings being wound so that said portions are magnetized to predetermined values in opposite directions respectively during one half cycle of the voltage and to different values in the reverse directions respectively during the inverse half cycle, means inductively coupled to said connection and responsive to the voltages in said connection comprising two rectifying paths, each path having a quick charging condenser and a high resistance shunted thereacross, and an indicating means actuated by the difference between the voltages of said condensers.

15. A magnetic field responsive system comprising a transformer having a primary winding and a secondary winding, means for supplying said primary winding with a periodically varying voltage, a saturable reactor comprising core means having two portions responsive to a magnetic field and a winding on each of said portions, constant resistance means connecting one end of each of said reactor windings to opposite ends of the transformer secondary winding, a connection between the remaining ends of said reactor windings and a mid-tap on the transformer secondary winding, said reactor windings being wound so that said portions are magnetized to predetermined values in opposite directions respectively during one half cycle of the voltage and to different values in the reverse directions respectively during the inverse half cycle, an amplifier inductively coupled to said connection and energized by the voltages in said connection, means responsive to the output of said amplifier comprising two rectifying paths, each path having a quick charging condenser and a high resistance shunted thereacross, and an indicating means actuated by the difference between the voltages of said condensers.

16. In a device of the class described, in combination, means including a bridge circuit and adapted to produce an alternating current of unsymmetrical wave form having peak voltages on one side of the zero axis thereof which are of greater magnitude than the peak voltages on the other side of the zero axis, said bridge circuit having constant resistance during any given cycle of said voltage whereby the integration of current in the output circuit of the bridge is zero, a peak voltmeter network responsive to the peak voltages on one side of the zero axis, a second peak voltmeter network responsive to the peak voltages on the other side of the zero axis, said peak voltmeter networks being operatively coupled to said output circuit of the bridge, means for connecting the outputs of said networks in opposition, and an indicating device actuated by said last named means.

17. In a device of the class described, in combination, means to produce an alternating current of unsymmetrical wave form without rendering dissimilar the areas of the positive and negative half cycles of the current wave form corresponding thereto, a rectifying device responsive to the maximum voltage of the positive half cycles, a quick charging condenser and a discharge resistor connected in parallel with the rectifying device, a second rectifying device responsive to the maximum voltage of the negative half cycles, a quick charging condenser and a discharge resistor connected in parallel with the second rectifying device, means for inductively coupling said rectifying devices to said voltage producing means, and an indicating means responsive to the difference between the voltages of said condensers.

ALVIN J. TICKNER.

References Cited in the file of this patent

UNITED STATES PATENTS

| Number | Name | Date |
|---|---|---|
| 2,016,977 | Thomas | Oct. 8, 1935 |
| 2,053,154 | La Pierre | Sept. 1, 1936 |
| 2,151,627 | Vacquier | Mar. 21, 1939 |
| 2,252,059 | Barth | Aug. 12, 1941 |
| 2,269,152 | Hathaway | Jan. 6, 1942 |
| 2,324,215 | Kinsburg | July 13, 1943 |
| 2,358,027 | Penther et al. | Sept. 12, 1944 |
| 2,390,051 | Barth | Dec. 4, 1945 |
| 2,406,870 | Vacquier | Sept. 3, 1946 |